(12) United States Patent
Doucet et al.

(10) Patent No.: US 12,138,529 B2
(45) Date of Patent: Nov. 12, 2024

(54) CONTROLLER APPARATUS AND CONTROL METHOD THEREOF

(71) Applicant: Sony Interactive Entertainment Inc., Tokyo (JP)

(72) Inventors: Nicolas Doucet, Yokohama (JP); Hideyuki Uchida, Ibaraki (JP); Naoyuki Saito, Tokyo (JP); Tomohito Ito, Kanagawa (JP); Eric Bailey, Tsukuba (JP); Masayuki Yamada, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 757 days.

(21) Appl. No.: 17/258,768

(22) PCT Filed: Jul. 2, 2019

(86) PCT No.: PCT/JP2019/026347
§ 371 (c)(1),
(2) Date: Jan. 8, 2021

(87) PCT Pub. No.: WO2020/013038
PCT Pub. Date: Jan. 16, 2020

(65) Prior Publication Data
US 2021/0275905 A1    Sep. 9, 2021

(30) Foreign Application Priority Data

Jul. 10, 2018 (JP) ................................. 2018-130924

(51) Int. Cl.
*A63F 13/215* (2014.01)
*A63F 13/24* (2014.01)
(Continued)

(52) U.S. Cl.
CPC ............ *A63F 13/215* (2014.09); *A63F 13/24* (2014.09); *A63F 13/285* (2014.09); *A63F 13/54* (2014.09);
(Continued)

(58) Field of Classification Search
None
See application file for complete search history.

(56) References Cited

U.S. PATENT DOCUMENTS 7,623,114 B2   11/2009   Rank
8,902,050 B2   12/2014   Heubel
(Continued)

FOREIGN PATENT DOCUMENTS

CN    1599925 A    3/2005
CN    102597914 A    7/2012
(Continued)

OTHER PUBLICATIONS

Notice of Reasons for Refusal for corresponding JP Application No. 2022-023086, 6 pages, dated Jan. 30, 2023.
(Continued)

*Primary Examiner* — Nafiz E Hoque
(74) *Attorney, Agent, or Firm* — Matthew B. Dernier, Esq.

(57) ABSTRACT

There are provided a controller apparatus and a control method thereof. The controller apparatus is held by a hand of a user and includes a microphone, a tactile sensation presentation device that presents a tactile sensation to the hand of the user, and a speaker. In addition, during a period in which the user inputs sound from the microphone, the controller apparatus reduces emission of sound of the speaker and causes the tactile sensation presentation device to perform control of tactile sensation presentation.

4 Claims, 2 Drawing Sheets

(51) Int. Cl.
*A63F 13/285* (2014.01)
*A63F 13/54* (2014.01)
*G08B 6/00* (2006.01)
*H04R 1/02* (2006.01)
*H04R 9/02* (2006.01)
*G05G 5/03* (2008.04)

(52) U.S. Cl.
CPC .............. *G08B 6/00* (2013.01); *H04R 1/028* (2013.01); *H04R 9/02* (2013.01); *A63F 2300/1037* (2013.01); *A63F 2300/1043* (2013.01); *A63F 2300/1081* (2013.01); *A63F 2300/6081* (2013.01); *G05G 5/03* (2013.01); *H04R 2499/11* (2013.01)

(56) References Cited

U.S. PATENT DOCUMENTS

| | | | |
|---|---|---|---|
| 10,150,029 | B2 | 12/2018 | Yamano |
| 2003/0067440 | A1 | 4/2003 | Rank |
| 2004/0180720 | A1* | 9/2004 | Nashi ...................... A63F 13/87 463/37 |
| 2011/0102160 | A1* | 5/2011 | Heubel .................. G06F 3/011 340/407.1 |
| 2016/0111087 | A1* | 4/2016 | Srail ........................ H03G 3/24 381/107 |
| 2017/0060245 | A1 | 3/2017 | Iino |
| 2017/0136354 | A1 | 5/2017 | Yamano |
| 2018/0137876 | A1 | 5/2018 | Sun |
| 2019/0045296 | A1* | 2/2019 | Ralph .................... H04R 1/222 |
| 2019/0272034 | A1* | 9/2019 | Pan ........................ G06F 3/0346 |

FOREIGN PATENT DOCUMENTS

| | | |
|---|---|---|
| CN | 108074583 A | 5/2018 |
| JP | 8314492 A | 11/1996 |
| JP | 2003248498 A | 9/2003 |
| JP | 2005506613 A | 3/2005 |
| JP | 2010015551 A | 1/2010 |
| JP | 2015231098 A | 12/2015 |
| JP | 2017049698 A | 3/2017 |
| JP | 2017082625 A | 5/2017 |
| JP | 2018091911 A | 6/2018 |

OTHER PUBLICATIONS

International Preliminary Report on Patentability and Written Opinion for corresponding PCT Application No. PCT/JP2019/026347, 15 pages, dated Jan. 21, 2021.
International Search Report for corresponding PCT Application No. PCT/JP2019/026347, 4 pages, dated Aug. 20, 2019.
The First Office Action for corresponding CN Application No. 201980044683.1, 14 pages, dated Nov. 2, 2023.

* cited by examiner

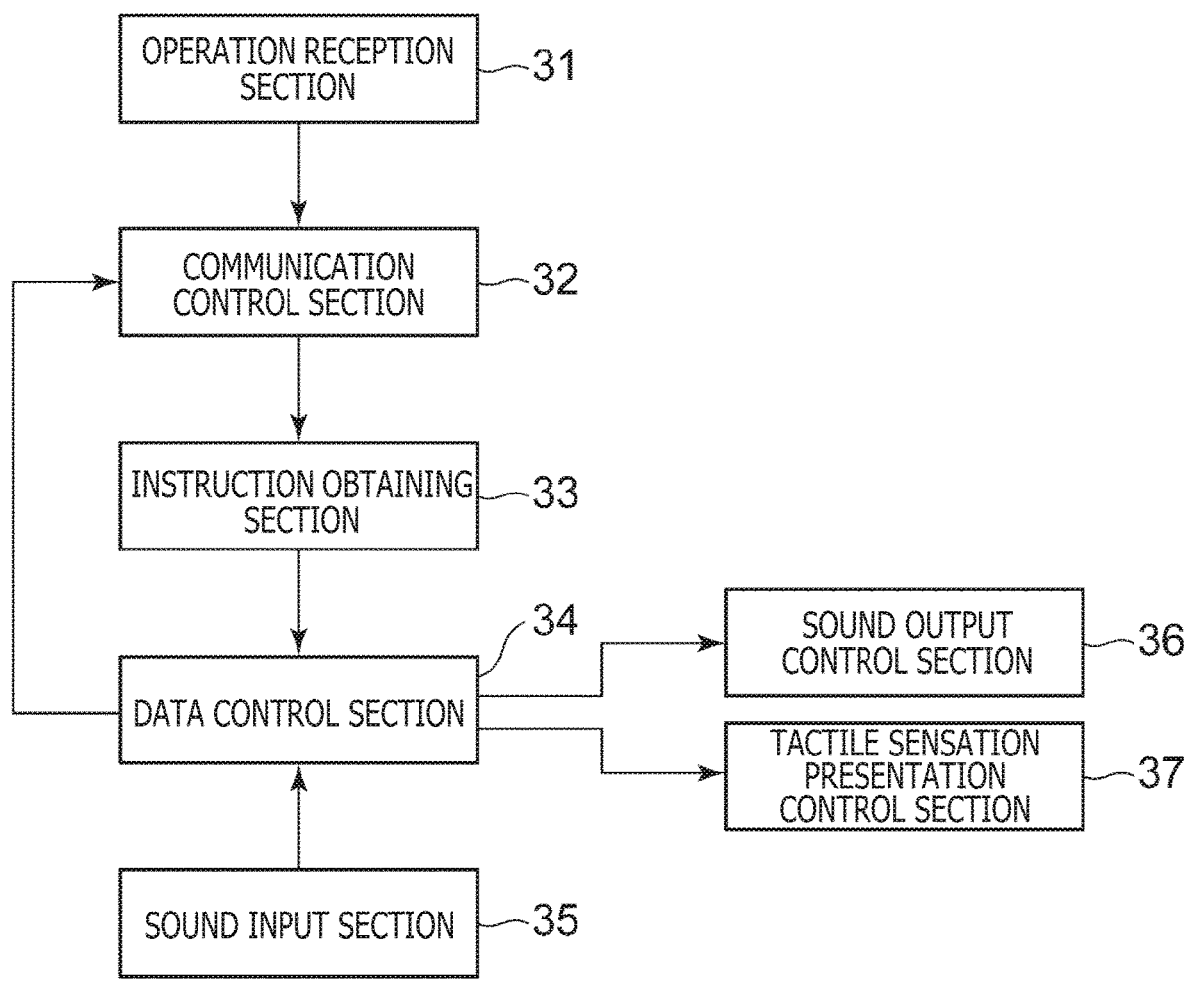

CONTROLLER APPARATUS AND CONTROL METHOD THEREOF

TECHNICAL FIELD

The present invention relates to a controller apparatus that is held by a hand of a user and a control method thereof.

BACKGROUND ART

A controller apparatus to be connected to, for example, a home video game console has been highly functionalized more and more in recent years, and various devices such as a tactile sensation presentation device and a speaker have been mounted on the controller apparatus.

SUMMARY

Technical Problem

With such high-functionalization as background, not only processing for individually controlling various devices mounted on the controller apparatus but also control using a plurality of devices in a combined manner has been considered.

However, in a case of controlling the plurality of devices in a combined manner, when the control is performed without considering a characteristic of each device, an involuntary operation is performed, in some cases.

The present invention has been made in consideration of such circumstances, and one object thereof is to provide a controller apparatus that can perform control of a plurality of devices in a combined manner while avoiding an involuntary operation and a control method thereof.

Solution to Problem

One aspect of the present invention for solving the above-described problem of the conventional example is a controller apparatus that is held by a hand of a user and includes a microphone, a tactile sensation presentation device for presenting a tactile sensation to the hand of the user, and a speaker. During a period in which the user inputs sound from the microphone, emission of sound of the speaker is reduced, and the tactile sensation presentation device performs control of tactile sensation presentation.

Advantageous Effect of Invention

According to the present invention, control of a plurality of devices in a combined manner while avoiding an involuntary operation can be performed.

BRIEF DESCRIPTION OF DRAWINGS

FIG. 3 is a functional block diagram illustrating an example of the controller apparatus according to the embodiment of the present invention.

DESCRIPTION OF EMBODIMENT

Figure 1:
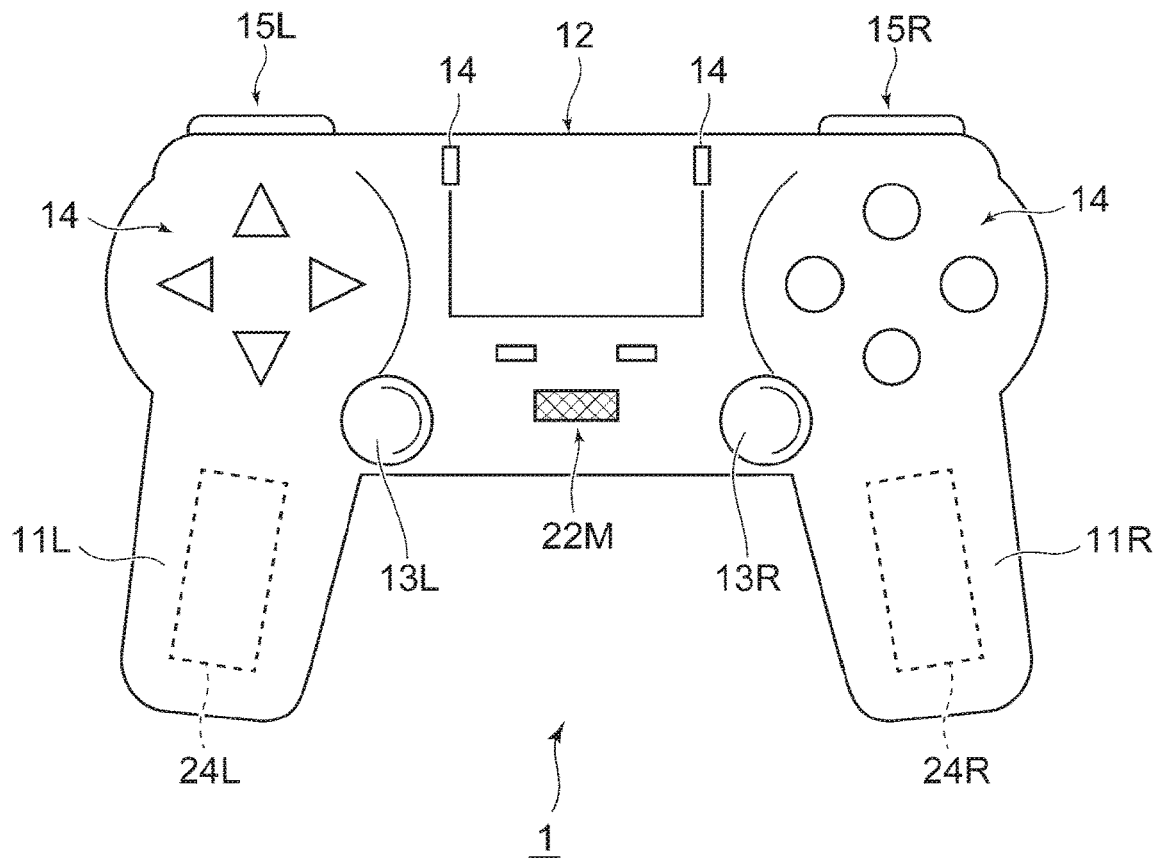
FIG. 1 is a plan view illustrating an outline of a controller apparatus according to an embodiment of the present invention.

An embodiment of the present invention will be described with reference to the drawings. As illustrated in FIG. 1, a controller apparatus 1 according to the embodiment of the present invention can be held by both hands of a user. The controller apparatus 1 includes holders 11L and 11R (hereinafter, when both of them are collectively described, referred to as the holders 11) and a main body unit 12. Herein, the holders 11L and 11R are respectively provided at left and right sides of a housing of the controller apparatus 1. When the user operates the controller apparatus 1 in a normal state, the holders 11L and 11R are respectively held by left and right hands. Further, in a state where the user holds the holders 11 with the both hands, joysticks 13L and 13R that can be operated so as to be tilted and a plurality of buttons 14 are disposed at positions on the main body unit 12 where respective thumbs of the left and right hands of the user reach.

In addition, in a state where the user holds the holders 11 with the both hands, switches 15L and 15R are disposed at positions where index fingers or middle fingers of the left and right hands of the user reach, on far-side side surface of the main body unit 12. However, configurations and arrangement of the joysticks, the buttons, and the switches are merely examples, and other switches and buttons may further be disposed in the controller apparatus 1.

In the following description of the present embodiment, a size, ratio, arrangement, or the like of the controller apparatus 1 itself or each unit thereof is merely an example, and the controller apparatus 1 of the present embodiment and each unit thereof such as a button are not limited to the illustrated size, ratio, and arrangement.

Figure 2:
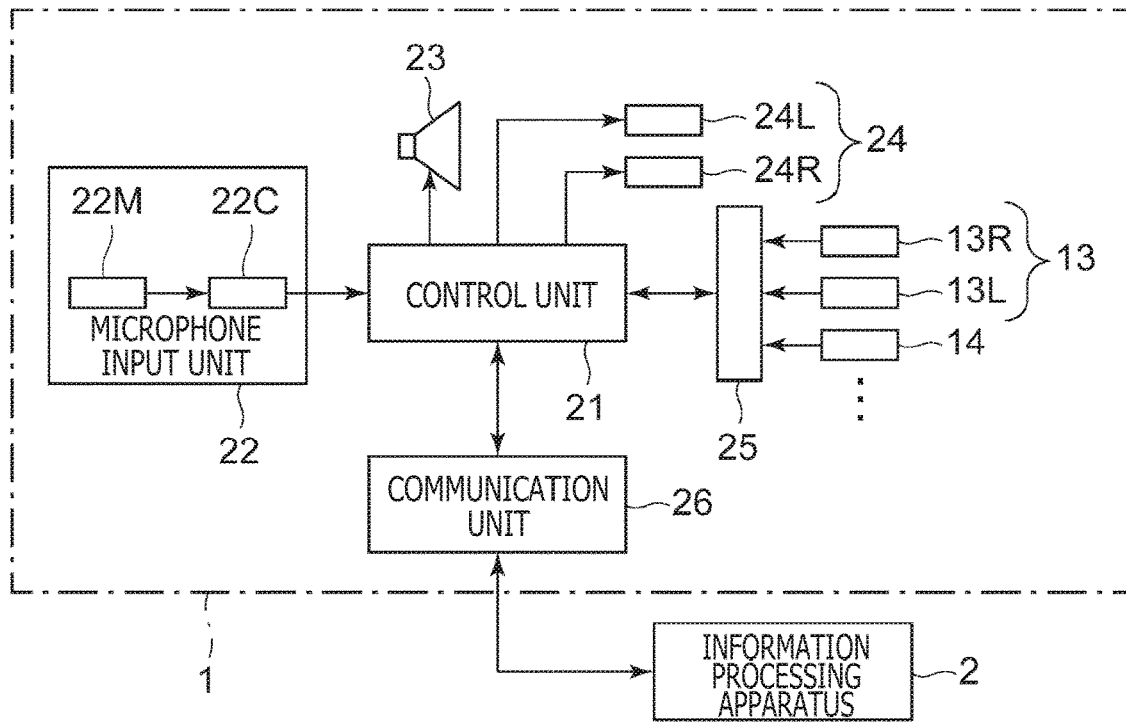
FIG. 2 is a block diagram illustrating a configuration example of the controller apparatus according to the embodiment of the present invention.

As illustrated in FIG. 2, the controller apparatus 1 further includes a control unit 21, a microphone input unit 22, a speaker 23, a tactile sensation presentation device 24, an interface 25, and a communication unit 26 therein. In the present embodiment, the controller apparatus 1 is connected to an information processing apparatus 2 such as a home video game console so as to communicate with each other.

The control unit 21 is, for example, a microcomputer and operates according to a program stored in a built-in memory. The program may be rewritten based on an instruction input from the controller apparatus 1 via the communication unit 26. Further, the memory built in the control unit 21 also operates as a work memory for retaining data necessary to be stored during the operation of the control unit 21. The detailed operation of the control unit 21 will be described later.

The microphone input unit 22 includes a microphone 22M and an A/D (Analog-to-Digital) converter 22C. The microphone input unit 22 converts a sound signal (vibration waveform) input via the microphone 22M into an electric signal and further converts the electric signal into a digital value to output the digital value to the control unit 21. Note that, in a certain example of the present embodiment, the microphone 22M is disposed on a near side of the main body unit 12 (a position on a near side when the user holds the controller apparatus 1).

The speaker 23 emits sound according to an instruction input from the control unit 21. The tactile sensation presentation device 24 includes, for example, a VCM (voice coil motor) and causes vibration following an instructed vibration waveform according to an instruction input from the control unit 21 to present a tactile sensation to the user holding the controller apparatus 1. In an example of the present embodiment, the tactile sensation presentation devices 24L and 24R are respectively disposed in the holders 11L and 11R one by one. In the following description, in a case where the tactile sensation presentation devices 24L and 24R are unnecessary to be distinguished (e.g., in a case where the both of them are controlled by similar waveform information), they are denoted as the tactile sensation presentation devices 24 while omitting notation of L and R.

The interface 25 is connected to, for example, the joysticks 13, the buttons 14, and the switches 15 and outputs a signal indicating details of operations performed with respect to those components to the control unit 21.

The communication unit 26 is a network interface or an interface that performs wireless or wired communication such as Bluetooth (registered trademark) or a USB (Universal Serial Bus), and communicates with the information processing apparatus 2 to output, for example, data received from the information processing apparatus 2 to the control unit 21. Further, according to an instruction output from the control unit 21, the communication unit 26 outputs, for example, instructed data to the information processing apparatus 2.

Next, an operation of the control unit 21 of the present embodiment will be described. As illustrated in FIG. 3, the control unit 21 of the present embodiment functionally includes an operation reception section 31, a communication control section 32, an instruction obtaining section 33, a data control section 34, a sound input section 35, a sound output control section 36, and a tactile sensation presentation control section 37.

The operation reception section 31 receives a signal indicating details of an operation of the user that is performed with respect to, for example, the joysticks 13 via the interface 25, to output the signal to the communication control section 32.

The communication control section 32 transmits the signal indicating the details of the operation of the user, which is input from the operation reception section 31, to the information processing apparatus 2. The communication control section 32 also outputs data or other information received from the information processing apparatus 2 to the instruction obtaining section 33. The communication control section 32 further transmits data input from the data control section 34 to be described later to the information processing apparatus 2.

The instruction obtaining section 33 obtains an instruction included in the data received from the information processing apparatus 2. Herein, the obtained instruction includes, for example, a sound emission instruction and a tactile sensation presentation instruction. Further, the sound emission instruction includes waveform information indicating a waveform of sound to be output. Similarly, the tactile sensation presentation instruction includes waveform information indicating a tactile sensation to be presented.

The data control section 34 performs control so as to output the waveform information or other information obtained by the instruction obtaining section 33 to either the sound output control section 36 or the tactile sensation presentation control section 37 (or output to both of them). Further, the data control section 34 receives data input from the sound input section 35 and performs control so as to, for example, output the data to the communication control section 32, retain the data in the work memory, or output the data to either the sound output control section 36 or the tactile sensation presentation control section 37 (or output to both of them).

In the present embodiment, according to a predetermined condition, the data control section 34 controls an output destination of the waveform information or performs processing for applying a filter (e.g., low pass filter) to the waveform information. An operation of the data control section 34 will be described later while citing examples.

The sound input section 35 receives the sound signal output from the microphone input unit 22 and outputs the sound signal to the data control section 34. When receiving the waveform information from the data control section 34, the sound output control section 36 converts the received waveform information into an analog signal and controls the speaker 23 to emit sound using the analog signal.

When receiving an input of the waveform information output from the data control section 34, the tactile sensation presentation control section 37 controls the tactile sensation presentation devices 24 such as the voice coil motors according to the received waveform information to present the tactile sensation to the user.

Control Example

Next, an example of control in the controller apparatus 1 of the present embodiment will be described. The following processing will sequentially be described.

(1) Processing example upon inputting sound from microphone
(2) Processing using input sound
(3) Control for simultaneously performing control of speaker and control of tactile sensation presentation
(4) Sound input as operation input
(5) Setting by sound input

[(1) Processing Example Upon Inputting Sound from Microphone]

In this example of the present embodiment, a case where the user inputs sound from the microphone 22M will be described. For example, when the user performs a predetermined operation indicating that the user performs the sound input, the control unit 21 of the controller apparatus 1 receives the signal input from the microphone input unit 22 during a period in which the operation is performed, and stores the signal in the memory.

In this manner, during the period in which the user performs the operation indicating that the user performs the sound input, that is, during a period in which the user inputs the sound from the microphone 22M, the control unit 21 performs control so as to reduce emission of sound of the speaker 23, as the operation of the data control section 34. In other words, the control unit 21 does not output the waveform information relating to the sound emission instruction to the sound output control section 36, the waveform information being received from the information processing apparatus 2, and controls the speaker 23 so as not to emit sound.

On the other hand, the control unit 21 performs control for presenting the tactile sensation by the tactile sensation presentation devices 24. In other words, as the operation of the data control section 34, the control unit 21 outputs the waveform information relating to the tactile sensation presentation instruction to the tactile sensation presentation control section 37, the waveform information being received from the information processing apparatus 2.

Further, at this time, as the operation of the data control section 34, the control unit 21 may output the waveform information relating to the sound emission instruction to the tactile sensation presentation control section 37, the waveform information being received from the information processing apparatus 2, and present the waveform information indicating the sound to be emitted as the tactile sensation. Note that, in a case where the tactile sensation presentation instruction is received from the information processing apparatus 2 together with the sound emission instruction, the control unit 21 may generate waveform information obtained by adding the waveform information relating to the sound emission instruction to the waveform information relating to the tactile sensation presentation instruction, and output the waveform information after addition to the tactile sensation presentation control section 37 to present vibration relating to both the sound emission instruction and the tactile sensation presentation instruction as the tactile sensation in a combined manner.

Further, as the operation of the data control section 34, during the period in which the user inputs sound from the microphone 22M, the control unit 21 may apply the low pass filter to the vibration waveform indicating the tactile sensation presented by the tactile sensation presentation devices 24. In this example, the control unit 21 performs data processing corresponding to the low pass filter on the waveform information to be output to the tactile sensation presentation control section 37. Such processing as the low pass filter in digital data can be implemented by processing as an FIR (Finite Impulse Response) digital filter, and the processing is widely known, thereby omitting a detailed description herein.

In this example, the tactile sensation presentation devices 24 are controlled based on the vibration waveform after the low pass filter is applied. Note that, as in the above-described example, in the case where the waveform information relating to the sound emission instruction is output to the tactile sensation presentation control section 37, the data processing corresponding to the low pass filter may be performed only on the waveform information relating to the sound emission instruction.

According to this example of the present embodiment, during the period in which the user inputs the sound, emission of sound of the speaker 23 is reduced. This can prevent the sound of the speaker 23 from being mixed with the sound of the user input from the microphone 22M.

Note that, although depending on arrangement of the microphone 22M and the tactile sensation presentation devices 24, the vibration of the tactile sensation presentation devices 24 vibrates the holders 11 of the controller apparatus 1 to present the tactile sensation to the user, whereas when the microphone 22M is disposed in the main body unit 12, the vibration of the tactile sensation presentation devices 24 is less likely to be caught by the microphone 22M. Then, in such a case, the control unit 21 presents the vibration of the tactile sensation presentation devices 24 as it is. The control unit 21 may further apply the low pass filter on the vibration presented by the tactile sensation presentation devices 24 to process. This allows the vibration presented by the tactile sensation presentation devices 24 to provide a characteristic that is further less likely to be caught by the microphone 22M.

In a case where the vibration of the tactile sensation presentation devices 24 is caught by the microphone 22M, the situation is different from the case of the speaker 23. In other words, since the tactile sensation presentation devices 24 do not vibrate air around the controller apparatus 1 so much, the vibration does not reach the microphone 22M via vibration of the air, but reaches the microphone 22M as it is mainly via vibration of the housing of the controller apparatus 1.

The control unit 21 may then subtract the waveform information output to the tactile sensation presentation control section 37 while being attenuated by predetermined amplitude (by performing control to decrease the amplitude), from the sound signal input from the microphone input unit 22. This can eliminate a component of the vibration of the tactile sensation presentation devices 24 from the sound signal input via the microphone 22M. Note that the above-described attenuation amount is experimentally determined, for example.

Further, in the example herein, it is assumed that, when the sound is input from the microphone 22M, the user performs the predetermined operation, but the present embodiment is not limited thereto. It may be assumed that, for example, during a period in which a sound signal exceeding a predetermined level is input to the microphone 22M, the above-described processing may be performed while determining that the user is inputting the sound from the microphone 22M.

[(2) Processing Using Input Sound]

The control unit 21 of the present embodiment may perform the following processing using the sound signal input from the microphone input unit 22.

The control unit 21 may output the waveform information indicating the sound signal, which is retained in the memory, for example, to the tactile sensation presentation devices 24 according to an instructing operation of the user to present the waveform information as the tactile sensation. Then, the user can feel or present the recorded sound such as his or her uttered voice as the tactile sensation.

Alternatively, the control unit 21 may transmit the waveform information indicating the sound signal, which is retained in the memory, to the information processing apparatus 2 as the waveform information indicating the tactile sensation. In this case, the information processing apparatus 2 transmits the waveform information to another information processing apparatus 2 or another controller apparatus 1. This waveform information may be used for control of the tactile sensation presentation devices 24 in the other controller apparatus 1 such as the controller apparatus 1 connected to the other information processing apparatus 2.

Further, the control unit 21 may change a pitch of the sound signal retained in the memory and cause the waveform information indicated by the sound signal whose pitch is changed to be emitted as sound via the speaker 23 or to be output to the tactile sensation presentation devices 24, according to the operation of, for example, the buttons by the user.

According to this example, by differentiating a change amount of the pitch when each button is pressed such that each button has a different tone interval, an operation in which, for example, a melody is played based on the sound signal retained in the memory can be performed.

Alternatively, at this time, the control unit 21 may detect the amplitude of the sound signal to be input to the microphone 22M, control the waveform information indicating the sound signal whose pitch is changed based on the amplitude of the detected sound signal, and make corrections such that the amplitude of the waveform information becomes larger as the detected sound signal becomes larger, to cause the waveform information to be emitted as sound via the speaker 23 or to be output to the tactile sensation presentation devices 24.

According to this example, control is performed such that, according to a breathing amount on the microphone 22M, the sound or the vibration becomes large. This enables production to be recognized as if a musical instrument such as a whistle or an ocarina is played.

Note that the control unit 21 may be caused to select, for example, a kind of the musical instrument that is supposed by the user and differentiate a control amount of the amplitude of the waveform information according to the above-described change amount of the pitch or the breathing amount, depending on the selected kind of the musical instrument.

In this case, the control unit 21 may output an instruction to the information processing apparatus 2 so as to display and output a user interface for causing the kind of the musical instrument to be selected. When the user operates this interface, the control unit 21 performs control so as to receive the selection of the kind of the musical instrument, for example, according to details of the operation. In other words, herein, without receiving control from the information processing apparatus 2, the control unit 21 may independently operate (using the information processing apparatus 2 as a display processing apparatus of the user interface) to receive various kinds of information or perform various kinds of control.

[(3) Control for Simultaneously Performing Control of Speaker and Control of Tactile Sensation Presentation]

Alternatively, although the controller apparatus 1 of the present embodiment performs processing such as emitting sound according to the instruction input from the information processing apparatus 2, at this time, as the operation of the data control section 34, the control unit 21 that has received the sound emission instruction may output the waveform information indicating the sound signal relating to the received sound emission instruction to the sound output control section 36 and also to the tactile sensation presentation control section 37.

In this example, in the processing such as the game, the user listens to the sound effect as the sound and receives the sound effect as the tactile sensation through the housing of the controller apparatus 1. This can improve realistic feeling in the case such as the game.

For example, in a case where the sound emission instruction is input together with the waveform information of sound of rainfall in a raining scene, the controller apparatus 1 emits the waveform information of sound of rainfall as the sound and vibrates the housing in synchronization with the sound of rainfall. Therefore, the user obtains the tactile sensation as if raindrops are hitting an umbrella and the like.

In this example of the present embodiment, together with the sound and the image, the tactile sensation in synchronization with the sound is presented in this manner, thereby providing reality to the user as a whole.

Alternatively, in this example of the present embodiment, when the waveform information indicating the sound signal relating to the sound emission instruction is output to the tactile sensation presentation control section 37, the data processing corresponding to the low pass filter may be performed on the waveform information, and then, the waveform information may be output to the tactile sensation presentation control section 37. At this time, a cut-off frequency of the low pass filter is set to be near a lower limit of the sound signal, for example. Further, the waveform information passing through the low pass filter may be amplified such that its amplitude reaches a predetermined level. This operation cuts the sound component and can enhance the tactile vibration more.

[(4) Sound Input as Operation Input]

The control unit 21 of the controller apparatus 1 of the present embodiment retains the sound signal input from the microphone input unit 22 in the memory, and in addition, may use the sound signal as follows.

In other words, in the present embodiment, the control unit 21 may generate information of a frequency and a sound volume of the sound signal input from the microphone input unit 22 and transmit the generated information to the information processing apparatus 2.

For example, the control unit 21 performs discrete Fourier transformation on the sound signal input from the microphone input unit 22 to analyze the sound volume for each frequency and outputs information indicating a frequency band having the largest sound volume as frequency information of the input sound signal.

Further, the control unit 21 outputs the maximum amplitude of the sound signal input from the microphone input unit 22 as sound volume information.

The information processing apparatus 2 receives the frequency information and the sound volume information from the controller apparatus 1 together with the information indicating details of the operation of the user with respect to the controller apparatus 1 to use those pieces of information for the processing such as the game.

For example, the information processing apparatus 2 receives the frequency information of the sound that is input by the user to the microphone 22M from the controller apparatus 1, and controls a parameter indicating an attacking range according to the frequency information in, for example, processing for attacking an opponent in the game. As an example, the information processing apparatus 2 may make the attacking range by a character controlled by the user wider (or may process as an instruction to perform attack having a relatively wide attacking range) in a game space, as the frequency indicated by the frequency information is lower. Further, the information processing apparatus 2 may make the attacking range by the character controlled by the user smaller (or may process as an instruction to perform attack having a relatively small attacking range) in the game space, as the frequency indicated by the frequency information is higher.

Alternatively, in this case, the information processing apparatus 2 may receive the sound volume information of the sound that is input by the user to the microphone 22M from the controller apparatus 1, and control a parameter of attacking power in the game based on the frequency information and the sound volume information described above.

For example, using frequency information f and sound volume information A, the information processing apparatus 2 calculates a parameter P of the attacking power as follows, $$P=\alpha A \cdot \beta f$$

and calculates a parameter T of the attacking range as follows.

$$T=\gamma/f$$

Herein, $\alpha$, $\beta$, and $\gamma$ are constants that are experimentally determined. According to this example, control is performed such that the lower the frequency of the sound input by the user, the lower the attacking power and the wider the attacking range. Further, the higher the frequency of the sound input by the user, the higher the attacking power and the smaller the attacking range.

[(5) Setting Operation by Sound Input]

Further, the control unit 21 of the controller apparatus 1 may transmit the waveform information of the sound signal that is input from the microphone input unit 22 and is retained in the memory to the information processing apparatus 2 as it is.

In this case, the information processing apparatus 2 may use the waveform information for the processing such as the game. For example, a course on which a game character moves may be generated based on the waveform information. As an example, the information processing apparatus 2 may generate an envelope curve (a curve indicating a change in amplitude) of the waveform information and use the envelope curve as the course on which the game character moves.

Alternatively, the information processing apparatus 2 may generate the waveform information indicating the tactile sensation to be presented to the user by using the input waveform information. This generation of the waveform information may also be performed by the processing to which the low pass filter is applied, for example.

Another Example

In the present embodiment, the tactile sensation presentation devices 24 are, for example, the voice coil motors, but the present embodiment is not limited to this example. For example, a device that presents vibration by a vibrator may be used, as long as the device can present the vibration to the user.

REFERENCE SIGNS LIST

1 Controller apparatus, 2 Information processing apparatus, 11 Holder, 12 Main body unit, 13 Joystick, 14 Button, 15 Switch, 21 Control unit, 22C A/D converter, 22 Microphone input unit, 23 Speaker, 24 Tactile sensation presentation device, 25 Interface, 26 Communication unit, 31 Operation reception section, 32 Communication control section, 33 Instruction obtaining section, 34 Data control section, 35 Sound input section, 36 Sound output control section, 37 Tactile sensation presentation control section

The invention claimed is:

1. A controller apparatus that is held by a hand of a user, the controller apparatus comprising:
   a control unit operating to receive waveform information relating to sound emission and waveform information relating to tactile sensation;
   a microphone;
   a tactile sensation presentation device that presents a tactile sensation to the hand of the user in response to tactile commands by the control unit; and
   a speaker operable to produce sound in response to sound commands by the control unit,
   wherein during a period in which the user inputs sound from the microphone, the controller operates to:
   (i) command a reduction in emission of sound of the speaker by modifying the emission indicated by the waveform information relating to sound emission, and
   (ii) generate the command to the tactile sensation presentation device by adding portions of the waveform information relating to sound emission and the waveform information relating to tactile sensation, such that the command to the tactile sensation presentation device relates to both waveform information relating to sound emission and waveform information relating to tactile sensation in a combined manner.

2. The controller apparatus according to claim 1, wherein during the period in which the user inputs the sound from via the microphone, a low pass filter is applied to the waveform information relating to tactile sensation, and the tactile sensation presentation device is controlled based on the waveform information after the low pass filter is applied.

3. The controller apparatus according to claim 1, wherein the tactile sensation presentation device includes a voice coil motor.

4. A control method of a controller apparatus that is held by a hand of a user, the controller apparatus including a control unit, a microphone, a tactile sensation presentation device that presents a tactile sensation to the hand of the user, and a speaker, the control method comprising:
   receiving at the control unit, waveform information relating to sound emission and waveform information relating to tactile sensation;
   presenting a tactile sensation to the hand of the user by the tactile sensation presentation device in response to tactile commands by the control unit; and
   producing sound by the speaker in response to sound commands by the control unit,
   wherein during a period in which the user inputs sound from the microphone, the controller operates to:
   (i) command a reduction in emission of sound of the speaker by modifying the emission indicated by the waveform information relating to sound emission, and
   (ii) generate the command to the tactile sensation presentation device by adding portions of the waveform information relating to sound emission and the waveform information relating to tactile sensation, such that the command to the tactile sensation presentation device relates to both waveform information relating to sound emission and waveform information relating to tactile sensation in a combined manner.

* * * * *